UNITED STATES PATENT OFFICE.

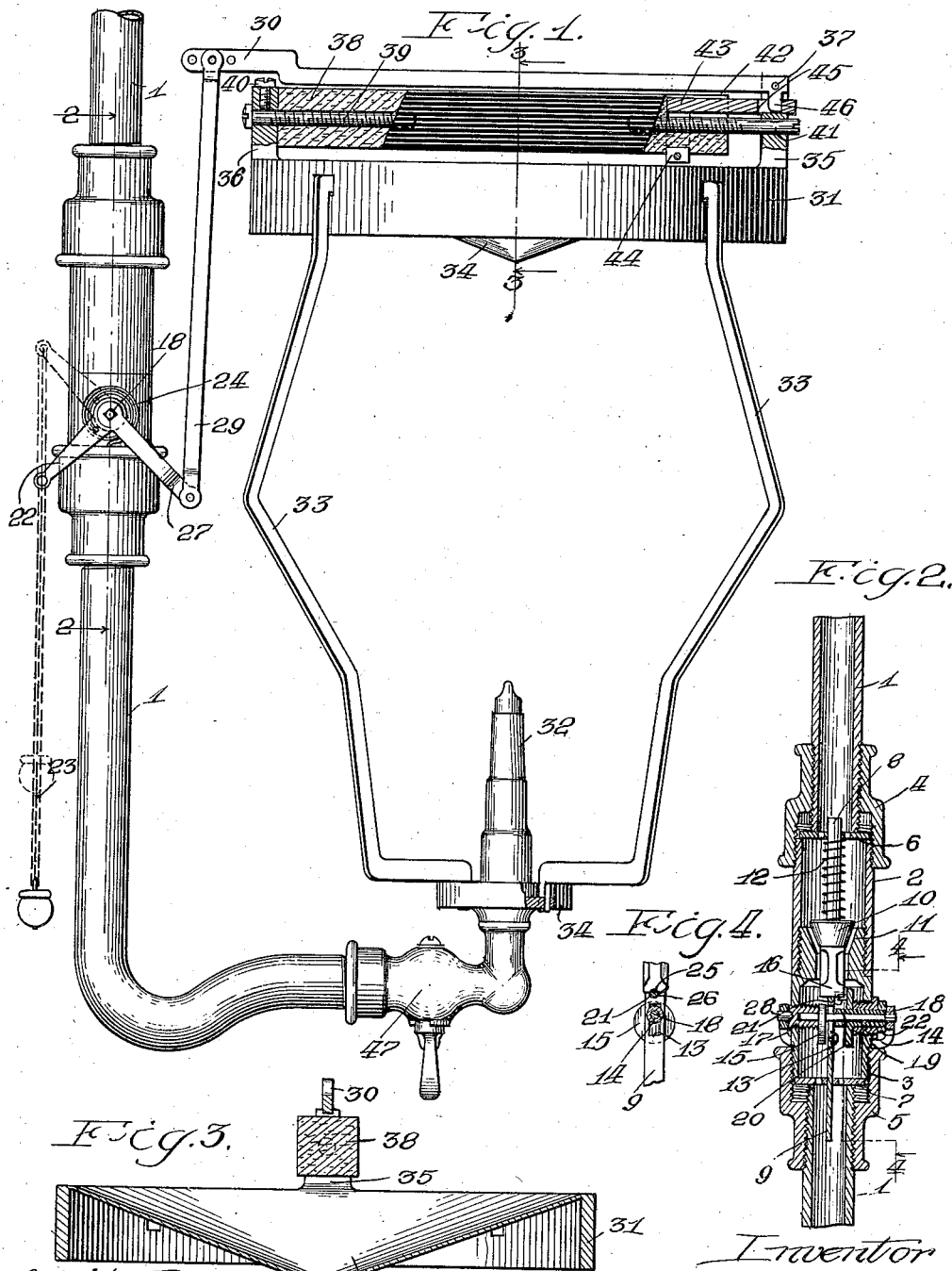

IGNAZ GLANSCHNIG, OF CHICAGO, ILLINOIS, ASSIGNOR OF ONE-HALF TO WILHELM HATZFELD, OF CHICAGO, ILLINOIS.

AUTOMATIC GAS-SHUT-OFF VALVE.

1,072,603.  Specification of Letters Patent.  Patented Sept. 9, 1913.

Application filed June 6, 1913. Serial No. 772,071.

*To all whom it may concern:*

Be it known that I, IGNAZ GLANSCHNIG, subject of the Emperor of Austria-Hungary, residing at Chicago, in the county of Cook and State of Illinois, have invented certain new and useful Improvements in Automatic Gas-Shut-Off Valves; and I do hereby declare the following to be a full, clear, and exact description of the invention, such as will enable others skilled in the art to which it appertains to make and use the same.

This invention has for its object to provide an automatic gas shut-off valve, particularly adapted for use on gas fixtures in homes and which is designed and intended to automatically shut off the gas in the event that the gas flame is blown out or otherwise accidentally extinguished without the closure of the gas cock.

The invention is illustrated in the accompanying drawings, in which—

Figure 1 is a view in side elevation, partly in section, of an automatic gas shut-off apparatus embodying my invention. Fig. 2 is a detail fragmentary longitudinal section of the valve casing on the line 2—2 of Fig. 1. Fig. 3 is a central vertical transverse section through the thermally controlled actuating means taken on the line 3—3 of Fig. 1. Fig. 4 is a fragmentary detail sectional view on the line 4—4 of Fig. 2.

The particular object of the invention is to provide automatic gas shut-off mechanism adapted to be applied to an ordinary style of gas fixture and which will prevent the escape of gas in any dangerous quantity in the event of the accidental extinguishment of the gas jet by causes other than closure of the gas cock.

A further object of the invention is to provide a thermally controlled device of this character in which, to primarily obtain a flow of gas, it is necessary for the user to operate two valve-actuating means, one of which is subsequently released by a thermostatically actuated means, which, at the same time, actuates a supplemental device whereby the function originally performed by the manually actuated part is performed by the thermally actuated part.

In the accompanying drawings a suitable embodiment of the invention is illustrated. This consists of a valve casing interposed between the ends of the service pipe 1 of a gas fixture. The valve casing comprises a cylindrical housing 2, a valve seat carrying member 3 and coupling members 4 and 5. Disposed in the ends of the valve housing are two perforated guide plates 6 and 7, each of which is provided with a central opening through which the stems 8 and 9 projecting from opposite ends of the valve 10 project and are actuated. The said valve 10 seats on the valve-seat 11 of the member 3 and is normally held on its seat by means of a light helical compression spring 12 interposed between the plate 6 and said valve 10. The valve stem 9 is flat and is provided between its ends with a longitudinal slot 13 through which a shaft 14 passes, the latter carrying a cam 15 which is adapted to engage the lower end of a part 16 of the valve stem 9 immediately below the valve 10 to raise said valve from its seat and support it in its raised position. Said shaft 14 is journaled at one end in a plug 17 fitted into a lateral opening in the member 3 and at its other end is journaled in a hollow shaft 18 which is similarly journaled in a diametrically oppositely disposed plug 19 in said member 3 and which carries a disk 20 provided with a crank pin 21, which is adapted to engage the lower end of the portion 16 of the valve stem 9, as hereinafter described.

Mounted on the hollow shaft 18 is an actuating arm 22 from the outer or free end of which a chain or cord 23 depends and by means of which said shaft may be manually actuated. The said shaft 18 is normally held in a position in which the arm 22 is disposed in the position indicated in dotted lines in Fig. 1 by means of the spring 24 engaged with said arm 22 and with a rigid part of the valve casing.

The lower end of the portion 16 of the valve-stem 9 disposed in the path of the crank pin 21 is provided with a little recess 25 in which said crank pin engages, and to one side of the said recess 25 said lower end is cut away at an incline to provide a surface 26 normally disposed in the path of said pin 21, and which, when engaged thereby, is adapted to be raised by said pin out of its path so that the latter may reach and engage in said recess 25, whereupon the said recess 25 and pin 21 coact to retain the said pin and valve stem interengaged.

The cam 15 engages the lower end of said portion 16 on the opposite side of the flat portion of the valve stem 9 and is adapted to raise the valve 10 to a greater elevation than said pin 21 is adapted to raise the same. Said cam 15 is adapted to be turned through an arc of ninety degrees, more or less, from its normal position by means of the forked lever 27 engaged with the square end of said shaft 14 and the other arm of which is revolubly mounted upon the projection 28 carried by the plug 17. The other arm of said lever 27 is pivotally connected with a link 29 which, at its other end, is pivotally connected with a lever 30, the latter being pivotally mounted upon an expansion member 31. The latter consists of a ring of metal which is supported above the gas burner 32 upon a plurality of arms 33 which, at their lower ends, engage in a collar 34 carried by the gas fixture and at their upper ends are suitably engaged with said ring 31. Carried by the ring 31 is an inverted conical plate 34 against which the hot air and gases impinge, and by means of which the same are deflected so as to heat the said ring 31. The latter carries two integral diametrically oppositely disposed projections 35 and 36, the former being bifurcated at its free end and receiving the pivoted end of the lever 30, the latter being pivotally secured therein by means of the pin 37 passing through said lever and through the contiguous portions of the projections 35.

A stick of carbon or other suitable material having lower coefficient of expansion than the ring 31 is rigidly secured to the projection 36, this being suitably accomplished by providing a threaded opening in one end of the carbon 38 in which the screw 39 engages, the latter being held against rotation after securely drawing the carbon into contact with the projection 36 by means of the set screw 40. A similar screw 41 is fitted in the other end of said carbon, the outer end portion thereof being devoid of threads and passing freely through an opening in the projection 35, said last-named screw serving merely as a support for the other end of the carbon. The latter is cut away at said end to provide a recess 42 in which a bar 43 is securely mounted by means of a clamp-collar 44 of any suitable construction, whereby relative longitudinal movement between said carbon and said bar 43 is prevented. The said bar projects into the recess in the bifurcated end of the projection 35 and is provided contiguous to its outer end with a longitudinal slot 45 in which a projection 46 on the pivoted end of the lever 30 engages.

The flow of gas from the burner 32 is controlled by the usual gas cock 47 in addition to the valve 10 so that in igniting the gas it is necessary that the said gas cock 47 be first opened and the chain 23 drawn downward to turn the hollow shaft 18 and disk 20 so that the pin 21 will raise the valve 10 from its seat and engage in said recess 25 in the lower end of the part 16 of the stem of said valve 10 to primarily open the latter. After these two valves have been opened the gas may be ignited and the heat generated by the latter will then cause the ring 31 to expand, thereby moving the pivoted end of the lever outwardly relatively to the bar 43 and carbon stick 38. Thereby the projection 46 of said lever 30 will cause the latter to be turned on its pivot and, as the same is so turned, the link 29 will obviously turn the arm 27 and shaft 18 so as to cause the cam 15 to engage the lower end of the portion 16 of the valve 10 and raise the latter to a greater elevation than the same has been primarily raised by the pin 21. As soon as the valve 10 attains the higher elevation, the pin 21 will be raised from engagement in the recess 25 and the spring 24 will thereupon return the hollow shaft 18 and arm 22 to the normal position indicated in dotted lines in Fig. 1. The valve 10, however, is still maintained open as is also the cock 47. In the event that the gas flame should be blown out or otherwise extinguished by causes other than closure of the cock 47 the ring 31 will immediately cool off and in the course of a few seconds will contract, thereby causing the lever 30 to return to the position indicated in Fig. 1 and turning the cam 15 out of engagement with the lower end of the part 16 of the valve 10, thereby causing the latter to become seated and shutting off the supply of gas.

In order to reignite the gas it is necessary to again pull the chain 23 to open the valve 10, whereupon the foregoing operation will repeat in the event of an accidental reëxtinguishment of the gas. The cock 47 may obviously be omitted without affecting the operation of the device.

My invention is, of course, capable of being variously modified, the drawings being intended to illustrate a suitable embodiment without reference to the ultimate details of construction which may be readily adapted to best suit my purposes.

I claim as new and desire to secure by Letters Patent:—

1. Automatic gas shut-off means comprising in combination a valve casing interposed in the service pipe, a valve and a valve-seat therein, the valve member having a portion projecting beyond the said seat; a pair of rotatable members housed by said casing and both adapted to engage the said projecting portion to open the valve, one of said members manually actuable; a thermally expansible member, and connections between the latter and the other of the said valve-opening members for actuating the latter in response to the expansion and contraction of the said expansible member.

2. Automatic gas shut-off means comprising in combination a valve casing interposed in the service pipe, a seat therein, a valve member slidably mounted within said casing, a spring tending to force the said valve against the said seat; a pair of rotatable members mounted upon separate and concentric shafts within the said casing, each thereof adapted to engage a portion of the said valve member to raise the latter from its seat; there being coacting formations upon one of the said rotating members and the valve member whereby the said rotating member is retained in its valve-opening position, the said rotating member being manually operated and spring retracted; the other of said rotatable members being adapted to move the valve member for a sufficient distance to enable the said coacting formations to release each other; and thermostatically actuated means for operating the last-named valve-actuating member.

3. Thermally controlled valve closing means comprising a valve disposed in the service pipe, a thermally expansible member disposed contiguous to the point of consumption of the gas and adapted to be heated thereby, a rotatably mounted valve-opening cam disposed in the service pipe, connections between the said cam and said thermally expansible member whereby said cam will be rotated into position to open said valve as said member becomes hot; an auxiliary manually operated and spring-retracted cam rotatably mounted in the service pipe and adapted to primarily open the said valve, there being coacting formations upon the said cam and valve for retaining the former in its valve-opening position when it has been manually moved to the same; and a spring engaging the said valve and holding the same in its said coacting relation with the said manually actuable cam, the said spring also tending to close the valve; the said thermally actuated cam adapted to open the said valve to a greater extent than the said manually actuated cam, thereby throwing the latter out of engaging relation to the said valve.

4. In an automatic gas shut-off device, the combination with a valve casing interposed in the service pipe and a valve therein, of thermostatically actuated means for operating the said valve; the said means comprising a ring and a rod of materials having different coefficients of expansion, the said rod being mounted diametrically of the said ring and rigidly secured at one of its ends to the ring, the other end of the said rod being slidable with respect to the portion of the ring diametrically opposite to that to which the aforesaid end of the rod is secured; transmission mechanism connecting the said ring, rod and valve for causing the relative motion of the said slidable end of the rod with respect to the adjacent portion of the said ring to operate the said valve; and a heat deflector positioned between the point of consumption of the gas and the said rod, the said heat deflector operating to deflect the heated air toward the said ring.

5. Thermally controlled valve-operating means for a gas service pipe, comprising a valve disposed in the service pipe; a pair of expansible members disposed near the point of consumption of the gas; one of the said members having one of its ends rigidly secured to, and the other of its ends slidable with respect to, the other of the said members; a heat deflector positioned between the said point of consumption of the gas and one of the said expansible members, the said deflector operating to deflect the heated air toward the other of the said expansible members; and mechanism connecting the two expansible members and the said valve for operating the said valve by the difference in expansion or contraction of the said expansible members.

6. Thermally controlled valve-operating means for a gas service pipe, comprising a valve disposed in the service pipe; an expansible ring and an expansible rod both disposed near the point of consumption of the gas; a heat deflector interposed between the said point of consumption of the gas and the said rod, the said deflector adapted to direct the currents of hot air caused by the consumption of the gas against the said ring; and transmission mechanism connecting the said ring, rod and valve for causing the difference in expansion or contraction of the said ring and rod to operate the said valve.

In witness whereof I have signed my name in presence of two subscribing witnesses.

IGNAZ GLANSCHNIG.

Witnesses:
LUDWIG LECK,
R. W. LOTZ.